United States Patent [19]

Minami et al.

[11] Patent Number: 4,900,343

[45] Date of Patent: Feb. 13, 1990

[54] INDUCTION SYSTEM FOR INTERNAL COMBUSTION ENGINES

[75] Inventors: Shunji Minami, Fukuroi; Yasuo Nakao; Kazuhiko Nomura, both of Iwata, all of Japan

[73] Assignee: Yamaha Hatsudoki Kabushiki Kaisha, Iwata, Japan

[21] Appl. No.: 191,420

[22] Filed: May 9, 1988

Related U.S. Application Data

[62] Division of Ser. No. 312,679, Oct. 19, 1981, Pat. No. 4,760,703.

[30] Foreign Application Priority Data

| Oct. 25, 1980 | [JP] | Japan | 55-149936 |
| Dec. 26, 1980 | [JP] | Japan | 55-188950 |
| Dec. 26, 1980 | [JP] | Japan | 55-188951 |
| Apr. 16, 1981 | [JP] | Japan | 56-57751 |

[51] Int. Cl.$^4$ ............................................. B01D 50/00
[52] U.S. Cl. ........................................ 55/318; 55/529; 60/611
[58] Field of Search ................. 55/318, 319, 321, 529; 60/600, 605.1, 611

[56] References Cited

U.S. PATENT DOCUMENTS

| 1,389,101 | 8/1921 | Ohrvall | 55/318 X |
| 2,992,698 | 7/1961 | Pearson et al. | 55/321 X |
| 4,608,062 | 8/1986 | Hughes | 55/318 X |

Primary Examiner—Michael Koczo
Attorney, Agent, or Firm—Ernest A. Beutler

[57] ABSTRACT

Several embodiments of induction systems for internal combustion engines that improve the charging efficiency, particularly at low speeds are disclosed. Each embodiment employs a plenum chamber upstream of the engine throttle valve and a reed type check valve admits air to the plenum chamber so as to improve charging efficiency at low speeds by maintaining an air flow in the induction system. In accordance with some embodiments, a supercharger is also employed which discharges into the plenum chamber upstream of the throttle valve. This arrangement minimizes pulsation effects from the supercharger being transmitted to the engine intake ports. In addition, the reed type check valve can be employed in many of the embodiments to bypass the supercharger under conditions when the supercharger is not generating any significant boost. The location of the reed type check valve relative to the plenum chamber and throttle valve of the engine minimizes pulsations from being transmitted from the intake ports back to the check valve. In several embodiments an air cleaner housing is formed integrally with the plenum chamber to afford a more compact assembly.

8 Claims, 12 Drawing Sheets

INDUCTION SYSTEM FOR INTERNAL COMBUSTION ENGINES

This is a division of U.S. patent application Ser. No. 312,679, filed Oct. 19, 1981, now U.S. Pat. No. 4,760,703.

BACKGROUND OF THE INVENTION

This invention relates to an induction system for internal combustion engines and more particularly to a compact, high efficiency induction system.

It has been proposed to increase the power output of an internal combustion engine for a given engine displacement through the use of a supercharger. Most superchargers, and particularly those of the centrifugal type, do not generate any significant boost at low engine speeds. This is particularly true if the supercharger is of the exhaust turbine driven type (turbocharger). Since the supercharger is positioned in the induction conduit that supplies the chambers of the engine, the air flow across the supercharger at low engine speeds causes a restriction which may in fact decrease power output when the supercharger is not delivering any significant boost.

In order to avoid the aforenoted difficulties, it has been proposed to provide a valved bypass around the supercharger so that the air may be inducted directly into the engine without passing across the supercharger impeller during period when the supercharger is not delivering any significant boost. Systems of this type have employed pressure responsive valves for controlling the amount of bypass and these valves have been conventionally of the poppet or butterfly type. There are several disadvantages, however, to the use of such valves. Poppet valves are heavy and have relatively large inertia so that they fail to be sufficiently responsive to sudden changes in running conditions, as may readily occur in conjunction with this type of engine. The butterfly type valve has the disadvantage that its position may fluctuate due to engine vibrations and the normal pulsations which occur in an induction system.

It is, therefore, a first object of this invention to provide an improved supercharger bypass system for an internal combustion engine induction system.

It is another object of this invention to provide a bypass valve for a supercharged engine induction system that is more responsive to changes in running condition and less prone to vibrations.

In induction systems embodying superchargers and valved bypasses, it is normally the practice to employ a pressure responsive valve that controls the flow through the bypass. As is well known, however, the pressure in the induction system varies considerably during the running of the engine due to the alternate opening and closing of the intake valves or intake ports of the engine. Such pulsations can cause the pressure responsive valve to open and close at periods when such movement is neither desirable nor necessary. In addition, the effect of the pulsations on the valve element can very well subject it to greater wear than normal and, accordingly, predetermine failure. This is particularly true if a reed type valve is employed.

It is, therefore, a still further object of this invention to provide an improved bypass system for a supercharged engine wherein the valve is not subjected to vibration or pulsations in the intake system.

In addition to the pulsations in the induction system caused by the opening and closing of the inlets, the output of the supercharger, particularly if it is of the turbocharged type, also can cause variation in the pressure outlet. The same pulsation which occur in the intake side of the engine are also present in the exhaust side and can cause pulsations in the driving force of the turbocharger. These pulsations will affect a pulsating output of the compressor stage of the turbocharger which can deteriorate engine performance.

It is, therefore, still a further object of this invention to provide a supercharged induction system wherein pulsations in the output of the supercharger are isolated from the intake ports of the engine.

In induction systems that employ valved bypasses around the supercharger, it has been the practice to employ a valve member that is normally biased to a closed position. When the engine is operating under the condition that the supercharger is not generating any significant boost and unsupercharged air is delivered through the bypass, this means that the valve must be urged to an open position by the pressure difference across the induction system. Obviously, this adds a further restriction to the induction and can offset the advantages intended to be accomplished by the bypass.

It is, therefore, still a further object of this invention to provide an improved efficiency bypass type induction system for a supercharged internal combustion engine.

In conjunction with engine induction systems, it is the normal practice to provide an air cleaner that filters the intake air. In connection with certain forms of induction systems and particularly those which serve some of the objects aforenoted, it is desirable to provide a plenum chamber in the induction system between the air inlet and the individual intake ports of the engine. In certain vehicle applications such as in motorcycles, the size of the vehicle does not afford the opportunity to permit the incorporation of separate air cleaners, plenum chambers and the like.

It is, therefore, a still further object of this invention to provide a compact, combined air cleaner, plenum chamber device for the induction system of an internal combustion engine.

As has been noted, the induction system of an engine experiences uneven flow due to the sequential opening and closing of the intake valve or the intake port. Because of the stopping and starting of the intake charge, charging efficiency can deteriorate, particularly at low speeds when these effects are more pronounced. It has been proposed to employ a check valve in the intake passage of such an engine to improve the charging efficiency. However, since the area between the check valve and the intake port is normally quite small, the inertial energy of the intake air that is reserved by the use of the check valve is relatively insignificant. If, on the other hand, a large volume is provided upstream of the intake valve, the response time under acceleration can be significantly deterred since a larger volume of the air must be accelerated during abrupt throttle openings.

It is, therefore, a still further object of this invention to provide an induction system for an internal combustion engine wherein the charge efficiency of the engine is improved throughout the engine speed range without deteriorating responsiveness to rapid accelerations.

SUMMARY OF THE INVENTION

A first feature of this invention is adapted to be embodied in an induction system for a supercharged internal combustion engine having an intake, an inlet passage to a chamber of the engine, a supercharger having an inlet, a compressor element and an outlet, and passage means communicating said intake with said inlet passage without flowing across said supercharger compressor element, communicating said intake with said supercharger inlet and communicating said supercharger outlet with said inlet passage. In accordance with this feature of the invention, reed valve means are provided for restricting the flow through a portion of the passage means until the pressure thereon exceeds a predetermined value.

Another feature of the invention is adapted to be embodied in an induction system for a supercharged internal combustion engine having an intake, an inlet passage to a chamber of the engine, a supercharger having an inlet, a compressor element and an outlet, passage means communicating said intake with said inlet passage without flowing across the supercharger compressor element, communicating the intake with the supercharger inlet and communicating the supercharger outlet with the intake passage. In accordance with this feature of the invention valve means are provided for restricting the flow through a portion of the passage means until the pressure thereacross exceeds a predetermined value and a plenum chamber is interposed between the valve means and the inlet passage for minimizing the transmission of pulsations from the inlet passage to the valve means.

Yet another feature of the invention is adapted to be embodied in an induction system for a supercharged internal combustion engine having an inlet, an inlet passage to a chamber of the engine, a supercharger having an inlet, a compressor element and an outlet, passage means communicating the intake with the inlet passage without flowing across the supercharger compressor element, communicating the intake with the supercharger inlet and communicating the supercharger outlet with the inlet passage, and throttle valve means in the passage means for controlling the flow to the chamber. In accordance with this feature of the invention, valve means are provided upstream of the throttle valve means for restricting the flow through a portion of the passage means until the pressure thereacross exceed a predetermined value.

Yet another feature of the invention is adapted to be embodied in an induction system for a supercharged internal combustion engine having an intake, an inlet passage to a chamber of the engine, a supercharger having an inlet, a compressor element and an outlet, and passage means communicating the intake with the inlet passage without flowing across the supercharger compressor element, communicating the intake with the supercharger inlet and communicating the supercharger outlet with the inlet passage. In accordance with this feature of the invention, normally open valve means movable in response to a pressure differential are provided for restricting the flow through a portion of the passage means in response to a predetermined pressure differential.

Yet a still further feature of the invention is adapted to be embodied in an intake device for an internal combustion engine. The intake device comprises housing means defining an internal cavity, wall means as a part of the housing means for dividing the cavity into a plenum chamber and an air cleaner chamber. An inlet and outlet are provided to the air cleaner chamber with means for supporting an air cleaner element in the air cleaner chamber between the inlet and the outlet. Means define an intake to the plenum chamber and this means is communicated with the air cleaner chamber outlet. Means define a discharge from the plenum chamber that is adapted to communicate with a chamber of the engine.

Still another feature of the invention is adapted to be embodied in an induction system for a internal combustion engine having an intake passage communicating at its downstream end with a chamber of the engine, a plenum chamber of enlarged volume communicates with the upstream end of the intake passage and pressure responsive check valve means for controlling an inlet to the plenum chamber.

DETAILED DESCRIPTION OF THE PREFERRED EMBODIMENTS

Figure 1:
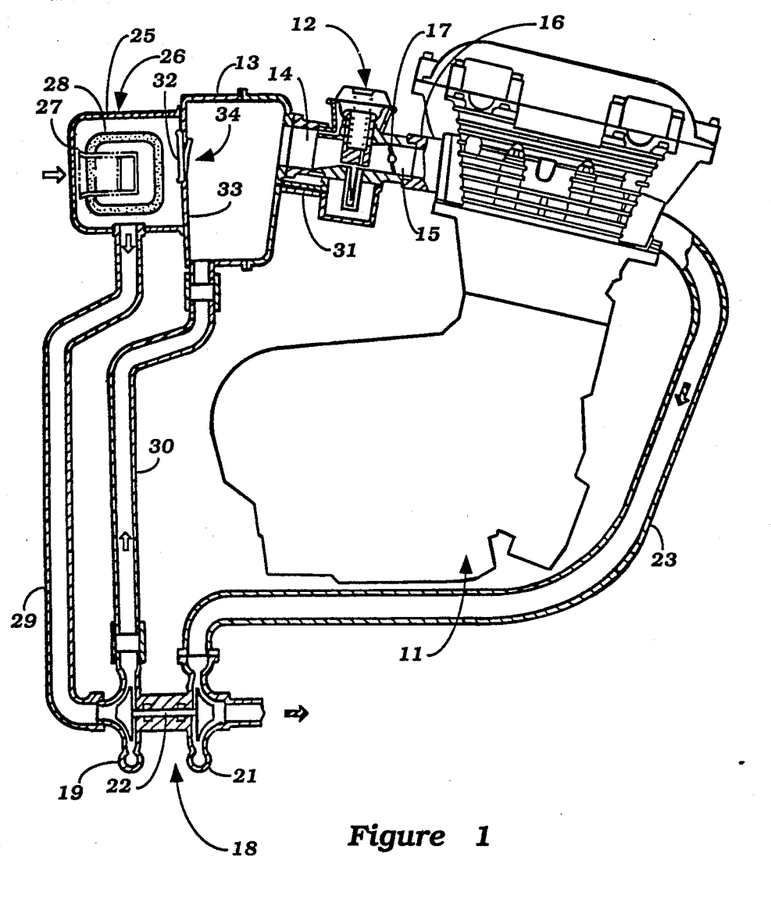
FIG. 1 is a side elevational view of an internal combustion engine embodying an induction system constructed in accordance with a first embodiment of this invention, with portions shown in cross section.

Embodiment of FIGS. 1 through 6:

A first embodiment of an internal combustion engine incorporating the invention is identified gennerally by the reference numeral 11. The engine 11 is, in the illustrated embodiment, particularly adapted to be used for powering a motorcycle and is a four cylinder, four cycle engine. It is to be understood, however, that certain facets of the invention may be used in conjunction with other types of vehicles and/or engines or other applications wherein internal combustion engines are employed. The engine 11 is equipped with one or more carburetors 12 that draw their intake air from a plenum chamber 13 through individual inlets 14. In this embodiment, there is a number of carburetors 12 equal to the number of cylinders of the engine. The carburetors 12 discharge through individual outlet passages 15 that communicate with the intake passages 16 of the cylinder head of the engine 11. Throttle valves 17 are positioned in the carburetor outlet passages 15 for controlling the flow therethrough in a known manner. In the illustrated embodiment, the carburetor 12 is of the air valve or SU type.

A turbocharger, indicated generally by the reference numeral 18, is provided for pressurizing the inlet air which is delivered to the plenum chamber 13 in a manner to be described. The turbocharger 18 consists of a compressor section 19, a turbine section 21 and includes a shaft 22 that interconnects the impeller of the compressor section 19 with the impeller of the turbine stage 11 for driving the compressor impeller. Exhaust gases are delivered to the turbine stage 21 through one or more exhaust pipes 23 of the engine. Exhaust gases are discharged from the turbine stage 21 through an exhaust pipe (shown only partially) and muffler (not shown).

The plenum chamber 13 is formed by an outer housing 24 to which is affixed an air cleaner housing portion 25. By virtue of this arrangement, the plenum chamber 13 and an air cleaner section, indicated generally by the reference numeral 26, may be formed by the same housing assemblage to provide a relatively compact arrangement which readily adapts itself for use in vehicles where space is a premium, such as a motorcycle. A central air inlet 27 is formed by the housing 25 and terminates in the internal cavity of an annular air filter element 28. The filtered air flows radially outwardly from the filter element 28 and discharges through a delivery pipe 29 that extends to the inlet of the compressor stage 19. The compressed air is delivered by an outlet pipe 30 to the interior of the plenum chamber 13 for delivery to the carburetor inlet 14. In order to balance the fuel discharge with the varying pressure within the plenum chamber 13, sensing passages 31 extend from the plenum chamber 13 to an area above the fuel in the float bowl of the carburetors 12.

Figure 2:
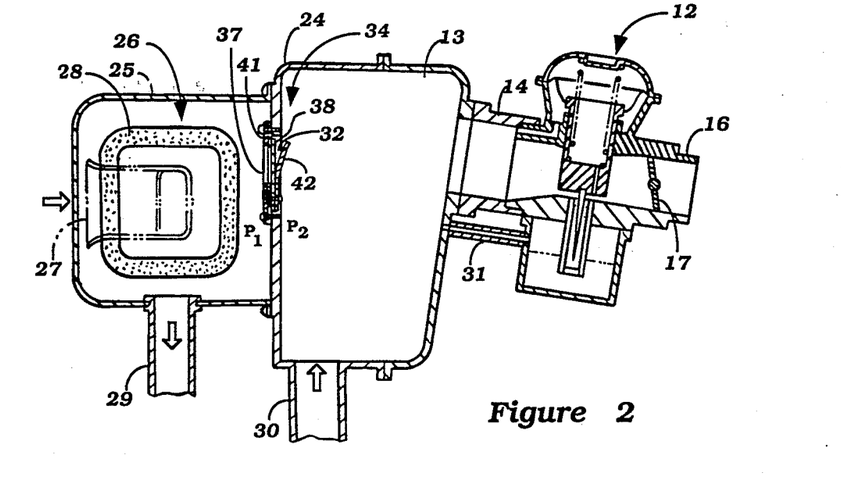
FIG. 2 is an enlarged cross-sectional view of a portion of the induction system of the engine shown in FIG. 1.
Figure 3:
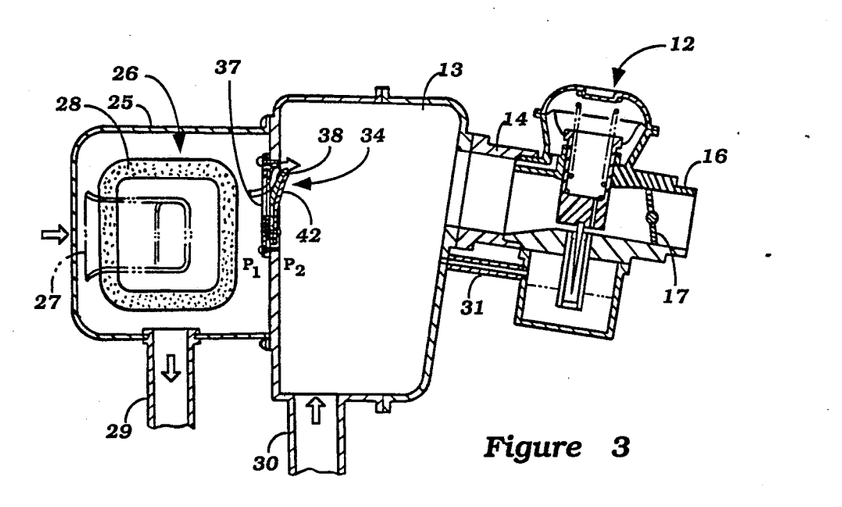
FIG. 3 is a cross-sectional view, in part similar to FIG. 2, showing another flow condition.
Figures 4, 5:
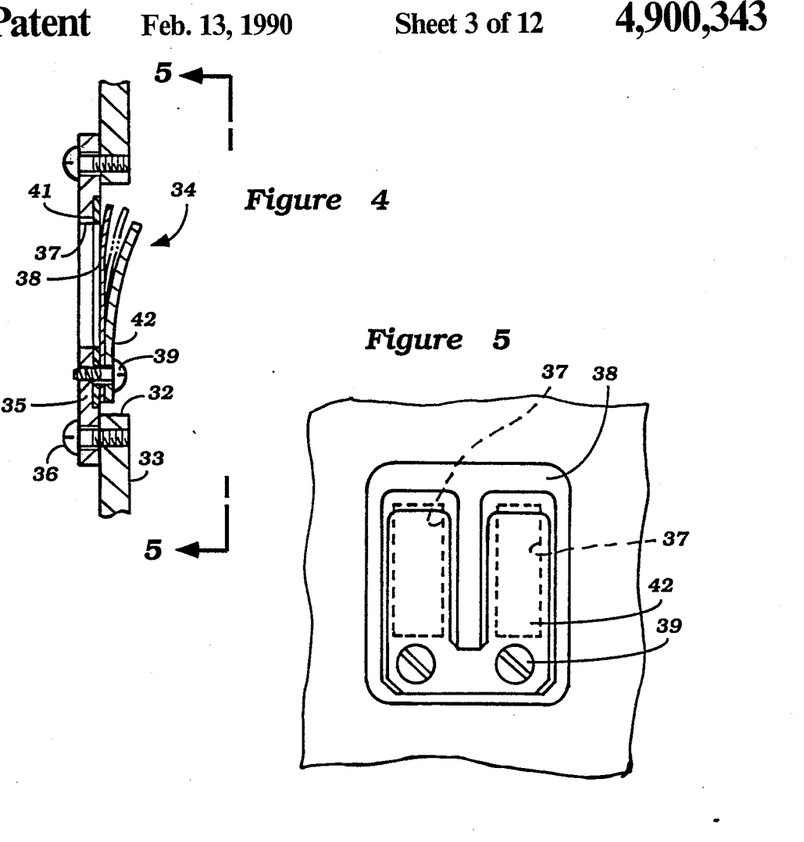
FIG. 4 is an enlarged cross-sectional view showing one of the valves of this embodiment.
FIG. 5 is an elevational view of the valve taken in the direction of the line 5—5 in FIG. 4.

There are times during the running of the engine 11 when the turbocharger 18 generates little or no boost. This occurs primarily under low speed conditions. In order to avoid flow restrictions at such running conditions and to permit direct air flow from the air cleaner stage 26 into the plenum chamber 13, a plurality of passages 32 are formed in a wall 33 of the housing 24 that divides the air cleaner section 26 from the plenum chamber 13. These openings 32 are preferably aligned with the individual carburetor air inlets 14 in connection with this embodiment.

In order to control the flow through the openings 32, individual reed type valves, indicated generally by the reference numeral 34, are provided. The reed type valves 34 are shown in most detail in FIGS. 4 and 5. The reed type valves 34 each comprise a valve plate 35 that is affixed to the wall 33 in a suitable manner as by screws 36. The plate 35 has a pair of generally rectangular openings 37. A bifurcated reed valve element 38 is affixed to the plate 35 by means of screws 39. The reed valve element functions like a leaf spring and is formed from a suitable material such as stainless or S. K. steel having a thickness of about 0.1 to 0.2 mm. Alternatively, a synthetic resin material of about 0.5 mm thickness may be employed. A valve seat 41 is interposed between the reed valve elements 38 and the valve plate 35. The valve seat 41 has openings that are aligned with and in registry with the valve plate openings 37. A curved, bifurcated stop member 42 is also affixed by the screws 39 to the valve plate 35 and is adapted to be engaged by the reed valve element 38 so as to limit the maximum amount that the element 38 may open and to limit stresses upon it.

Figure 6:
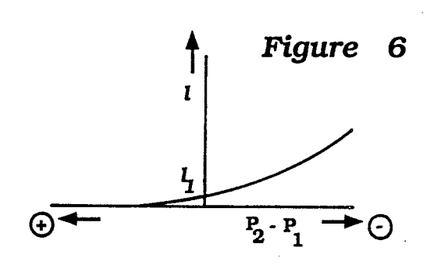
FIG. 6 is a graphical representation of the operation of the valve of the embodiment of FIGS. 1 through 5.

The reed valve element 38 has a slight degree of initial curvature so that when the engine is not running, it will be spaced a distance $l_1$ from the valve seat 41. Thus, during initial cranking of the engine there can be air flow directly from the air cleaner section 26 to the plenum chamber 13 without flow past the compressor stage impeller. When the engine is running at low speeds and the turbocharger is generating substantially no boost, the pressure in the air cleaner stage 26 downstream of the filter element 28 ($P_1$) will be higher than the pressure in the plenum chamber 13 ($P_2$) and the reed valve element 38 will be moved to a more fully opened position. The degree of opening of the reed valve element 38 is shown in relation to the pressure difference by the graph 6. When the engine is running at low speeds and at idle, the pressure in the air cleaner chamber ($P_1$) will be substantially greater than the pressure in the plenum chamber ($P_2$) and the check valve element 38 will be substantially fully opened. As the engine speed and boost developed by the compressor stage 19 increases, the valve element 38 will be moved toward its closed position. Since the valve element 38 is normally opened the distance $l_1$, the valve element 38 will move to this degree of opening when the boost pressure is equal to the pressure in the air cleaner section 26. As the boost continues to increase, the valve element 38 will eventually close and all air delivered to the carburetors 12 will be pressurized by the compressor stage 19.

Because of the use of the reed valve as opposed to valves of the type previously used, very good sensitivity will be provided and quick reactions will occur during sudden accelerations and decelerations. However, the reed valve 34 will not be rapidly opened and closed due to the fluctuations in pressure at the carburetor discharges 16 as occur when the engine intake valves open and close since the throttle valve 17 is interposed between this portion of the induction system and the reed valves 34. In addition, the plenum chamber 13 itself has a tendency to damp out this pulsation and further protect the reed valves 34 from fatigue. The reed valve element 38 enjoys its good response because of its low weight and the relatively low force required to move it between its opened and closed position. Of course, the elasticity of the element 38 causes it to quickly close when the supercharger boost is high and effects a good seal with the valve seat 41. The downstream positioning of the throttle valve 17 also insures accurate control of the fuel air mixture regardless of whether the intake charge is delivered from the compressor stage 19 or through the bypass afforded by the reed valves 34.

In addition to providing damping for the intake pulsations, the plenum chamber 13 also serves the purpose of damping pulsations which may be generated by the turbocharger 18 and for isolating these pulsations from the intake passage 16. There are pulsations in the exhaust pipes 23 which are caused by the alternate opening and closing of the engine exhaust valves. These pulsations are transmitted to the turbine stage 21 and cause the compressor stage 19 to be driven at an alternating rate, particularly at low speeds. These alterations in the output of the compressor stage 19 are effectively damped by the large volume of the plenum chamber 13.

In addition to all of the aforenoted advantages, the reed valves 34 and plenum chamber 13 cooperate to improve charge efficiency, particularly at low speeds, regardless of the boost of the turbocharger 18. In fact, as will become apparent from the description of later embodiments, there are advantages to the use of the plenum chamber 13 and reed type check valves 34 in their specific orientation even when a supercharger is not employed.

At low engine speeds the intake valves open and close, and each time the valves close the intake charge tends to stop flowing. During the next opening of the intake valve, the charge must be re-accelerated before it can be inducted into the chamber. By employing the reed type check valve 34 and the plenum chamber 13, it is possible to maintain a flow through the check valves 34 into the plenum chamber even after the intake valves of the engine are closed. Because of the previously existent air flow, there will be a reduced pressure in the plenum chamber 13 even when the engine intake valves close. Thus, a flow will be maintained passed the check valves 34 until the pressure in the plenum chamber 13 rises sufficiently to cause the check valves 34 to close. Thus, charging efficiency is improved, particularly at low speeds.

Figure 7:
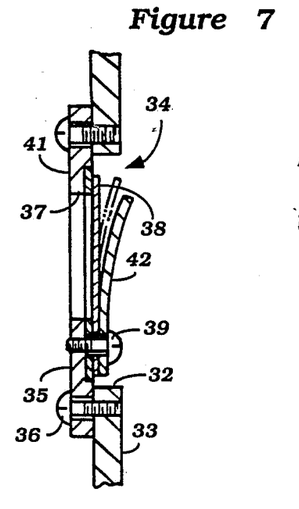
FIG. 7 is a cross-sectional view, in part similar to FIG. 4, showing another embodiment of the invention.
Figure 8:
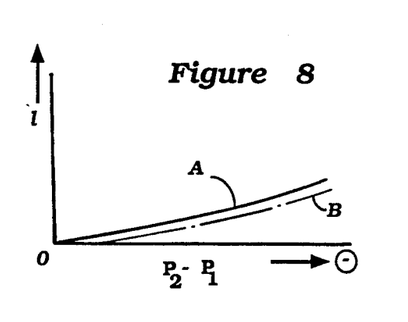
FIG. 8 is a graphical analysis showing the operation of the valve of the embodiment of FIG. 7.

Embodiments of FIGS. 7 and 8:

In the previously described embodiment the check valve 34 was designed in such way that it had an initial opened condition. Of course, the actual characteristics of the reed check valve 34 to provide the desired performance will depend upon a variety of factors such as supercharger performance, engine speed and type, etc. As shown in FIG. 7, the reed check valve 34 may be designed so that the reed valve element 38 is normally closed. In conjunction with this embodiment, there is no initial preload on the valve element 38 when it is closed so that its opening characteristics will follow the curve A as shown in FIG. 8. Curve B represents another embodiment wherein the reed valve element 38 normally has a bias in its closed position so that a predetermined pressure differential must be experienced before the valve element 38 will open.

Figure 9:
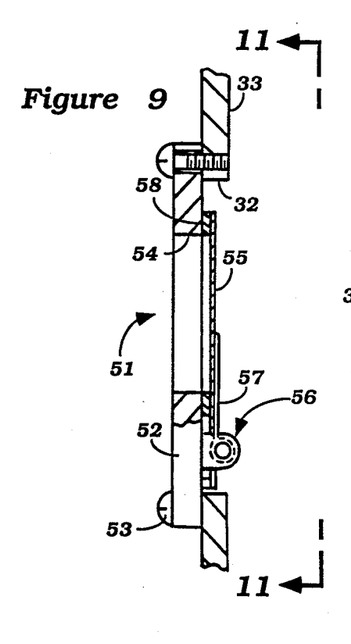
FIG. 9 is a cross-sectional view, in part similar to FIGS. 4 and 7, showing a still further embodiment of the invention.
Figure 10:
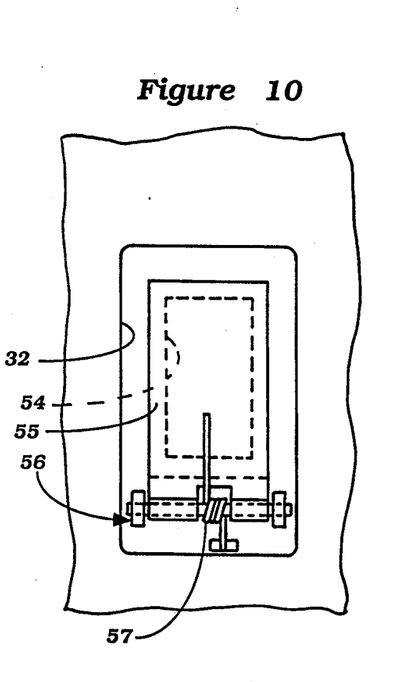
FIG. 10 is an elevational view taken in the direction of the line 10—10 of FIG. 9.

Embodiments of FIGS. 9 and 10:

In the preceding embodiments the reed type valve included a flexible leaf spring reed. It is possible, however, to employ a reed type valve embodying a spring biased, pivoted member, and such an embodiment is shown in FIGS. 9 and 10. Inasmuch as only the reed valve differs from the preceding embodiments, only this portion of the construction has been illustrated and is identified generally by the reference numeral 51. In accordance with this embodiment, a valve plate 52 is affixed to the wall 33 overlying the opening 32 by means of screws 53. The valve plate 52 has a central opening 54 which is aligned with the wall opening 32. A rigid reed member 55 is pivotally supported on the valve plate 52 by means of an hinge mechanism indicated generally by the reference numeral 56. A torsional spring 57 urges the reed member 55 into a closed sealing arrangement with a valve seat 58. The operation of this embodiment is the same as the previously described embodiments and for that reason will not be repeated. As with the previously described embodiments, the initial biasing on the reed member 55 may be such as to provide any desired opening characteristics to pressure variations.

Figure 11:
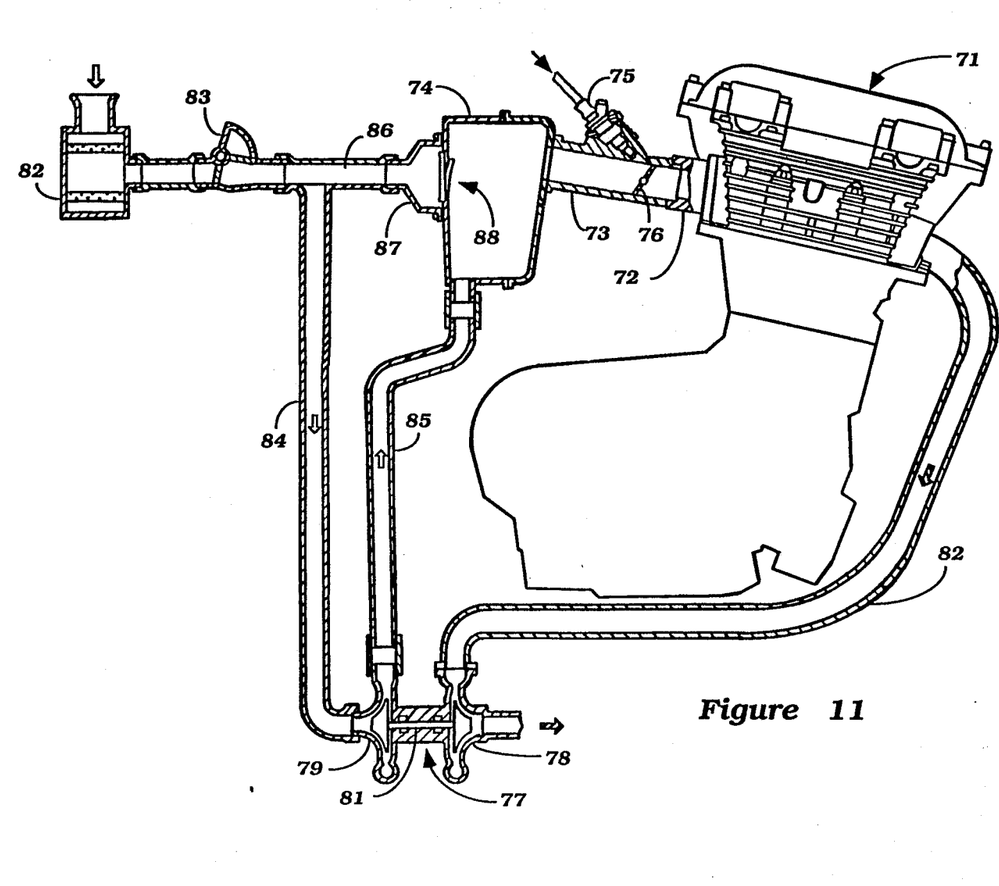
FIG. 11 is a side elevational view, with portions shown in cross section, similar to FIG. 1 and showing a still further embodiment of the invention.

Embodiment of FIG. 11:

In the preceding embodiments the invention has been described in conjunction with carbureted engines. The invention, however, is equally adaptable to engines embodying fuel injection, and such an embodiment is illustrated in FIG. 11, wherein the engine is identified generally by the reference numeral 71. The engine 71 has a plurality of chambers for example, 4 cylinders operating on the 4-stroke cycle with cylinder head intake ports 72 for each cylinder. Individual intake pipes 73 extend to the cylinder head intake ports 72 from a plenum chamber 74. Individual fuel injection nozzles 75 are provided in the passages 73 and inject toward the cylinder head intake ports 72. The injection nozzles 75 are disposed upstream of the respective throttle valves 76 that control the flow through the passages 73. The throttle valves 76 are all operated in unison through any suitable mechanism.

A turbocharger 77 is provided for delivering a pressurized charge to the plenum chamber 74 and remaining induction system. The turbocharger 77 includes an exhaust turbine stage 78 and a compressor stage 79. The impeller of the compressor and turbine stages are interconnected for simultaneous rotation by means of a shaft 81 so that the turbine stage will drive the compressor stage. The turbine stage 78 is driven by exhaust gases which are delivered to it by the exhaust pipe 82 of the engine 71.

An air cleaner 80 of any known type delivers filtered air to an air flow detector 83 that is adapted to provide a signal responsive to air flow for cooperation with the fuel injection system to supply metered fuel to the fuel injector 75 in a known manner.

A supercharger inlet pipe 84 intersects the air inlet downstream of the flow detector 83 for delivering filtered air to the turbocharger compressor stage 79. The compressed air is delivered to the plenum chamber 74 via a conduit 85.

An additional filtered air inlet conduit 86 extends downstream of the air flow detector 83 to a distribution box 87 provided on one side of the housing of the plenum chamber 74. A plurality of openings are formed in the wall of the plenum chamber 74 inside of the distribution box 87 and in alignment with the intake pipes 73. Check valves 88 control the flow through these passages as in the preceding embodiments so that filtered air will be delivered directly to the pipes 73 without flowing across the turbocharger compressor stage 79 when the boost of this stage is relatively low. As the boost increases, the check valves 88 will close and the air supplied to the engine will be supplied solely by the compressor stage 79.

As with the preceding embodiments, the reed type check valves 88, which incidently may be of the type as shown in any of the preceding embodiments, offer quick response during sudden accelerations or decelerations. Furthermore, the use of the plenum chamber 74 and the positioning of the check valve 88 upstream of the throttle valves 76 reduces undesired operation of the check valves 88 due to intake system pulsations, thus improving operating and minimizing wear in the valves 88. Furthermore, the use of the plenum chamber 74 downstream of the turbocharger compressor stage 79 minimizes the transmission of pulsations generated by speed variations of the turbocharger 77 from affecting the induction system. Since the flow detector 83 is positioned upstream of the check valves 88, the air flow will be accurately metered regardless of which path is delivered to the combustion chambers of the engine.

Figure 12:
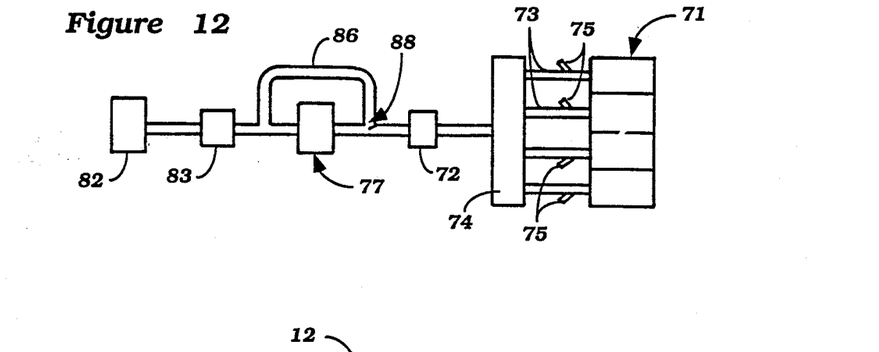
FIG. 12 is a schematic view showing a still further embodiment of the invention.

Embodiment of FIG. 12:

As was noted the embodiment of FIG. 11 uses a plurality of throttle valves, one for each of the intake passages. FIG. 12 illustrates another embodiment of a fuel injected engine herein a single throttle valve is employed for controlling the intake air flow. Since the components of this embodiment are the same as the embodiment of FIG. 11, the components have been identified by the same reference numerals and only their relative locations have been changed. As should be apparent from the schematic view, the downstream order of the components is that air enters the induction system through the air cleaner 82 and flows past the flow detector 83. The air then flows either through the compressor stage of the turbocharger 77 or may bypass through the passage 86. A reed type check valve 88 controls the flow through the passage 86 in response to pressure differences as aforenoted. A single throttle valve 72 is positioned downstream of the point where the intake passages merge and upstream of the plenum chamber 74. The plenum chamber 74 serves the individual intake passages 73 in which the fuel injection nozzles 75 are located.

The configuration of this embodiment permits the use of single throttle valve and a single reed type check valve. However, it does maintain all of the advantages of the previously described embodiments in that the reed type check valve 88 is positioned upstream of both the throttle valve 72 and the plenum chamber 74 so that it will be protected from inadvertant action by the pressure variations occuring when the individual cylinders are in their intake cycle. Furthermore, the plenum chamber 74 will still be effective so as to reduce any possible effect of pulsation in the output of the turbocharger 77.

Figure 13:
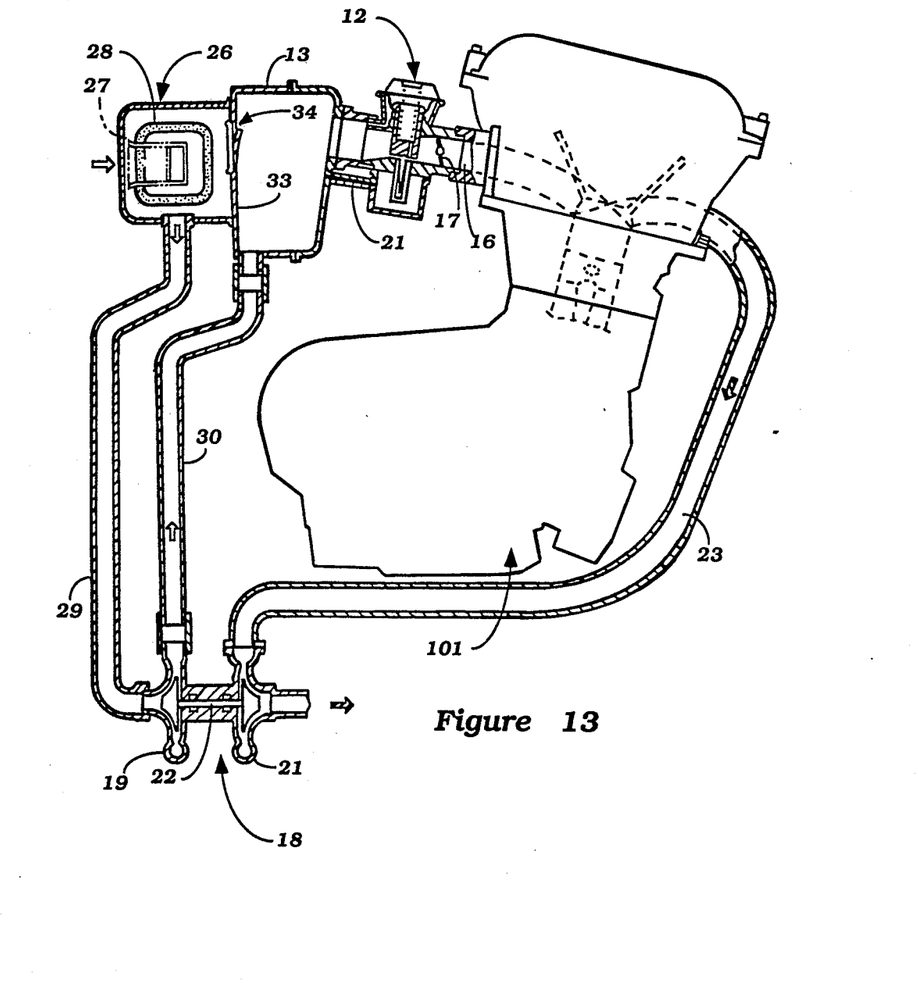
FIG. 13 is a side elevational view, with portions shown in cross section, in part similar to FIGS. 1 and 11, of a still further embodiment of the invention.
Figure 14:
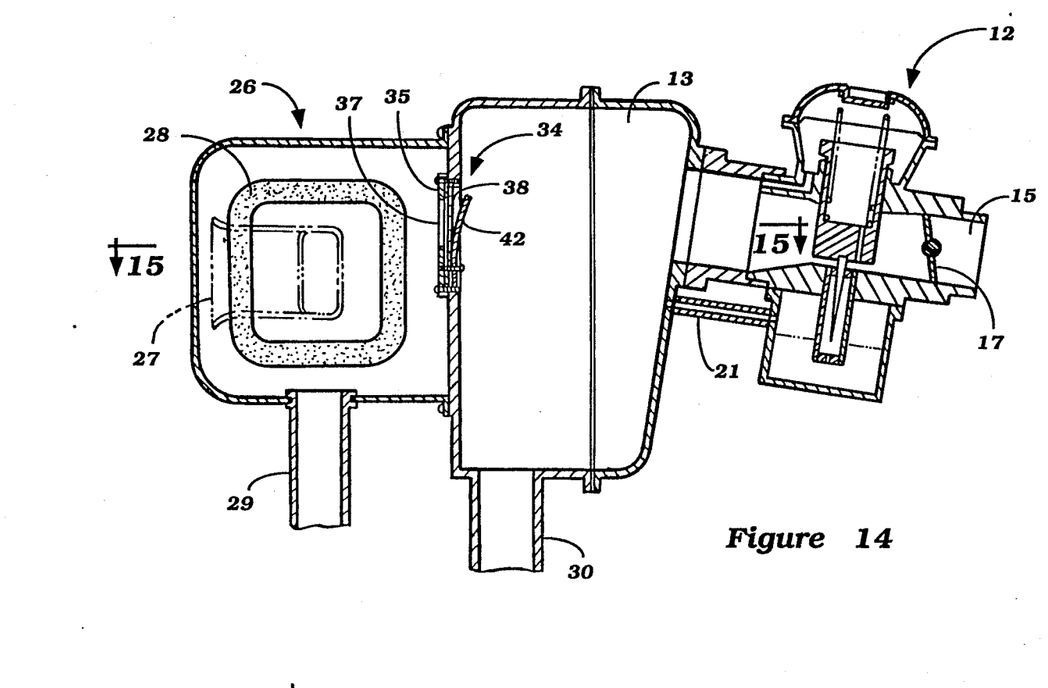
FIG. 14 is an enlarged cross-sectional view showing a portion of the induction system of the embodiment of FIG. 13.
Figure 15:
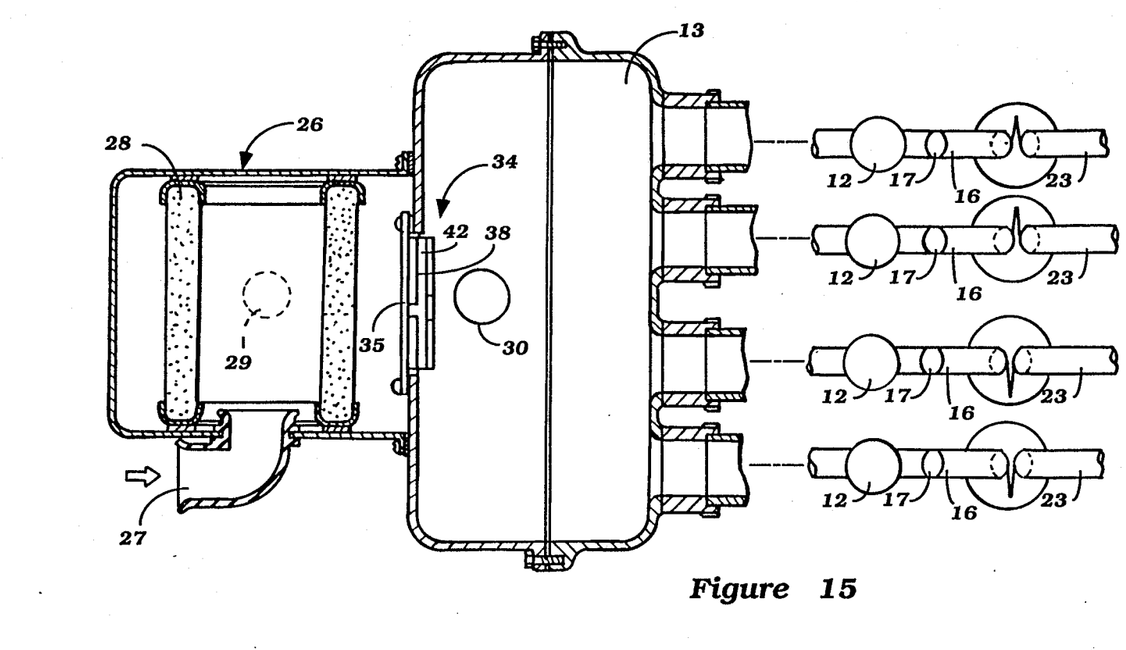
FIG. 15 is a cross-sectional view taken along the line 15—15 of FIG. 14.

Embodiments of FIGS. 13 through 15:

In all of the preceding embodiments, except for that of FIG. 12, there were a plurality of reed type check valves employed, each aligned with a respective one of the outlets from the plenum chamber 13 and with the induction system inlets. It would, of course, be possible to use an arrangement wherein only a single such valve or a lesser number of valves were employed. In FIGS. 13 and 15 an internal combustion engine constructed in accordance with such an embodiment is identified generally by the reference numeral 101. Except for the use of a single reed type check valve, all other portions of this embodiment is the same as that of FIGS. 1 through 6 and for that reason all common components have been identified by the same reference numerals that embodiment and their description and operation will not be repeated. Furthermore, this embodiment realizes all of the advantages as aforenoted and these advantages will not be repeated. Incidently, one of the piston and cylinder assemblies and the valving associated with it is shown in phantom in FIG. 13 and all cylinders are shown schematically in FIG. 15.

Figure 16:
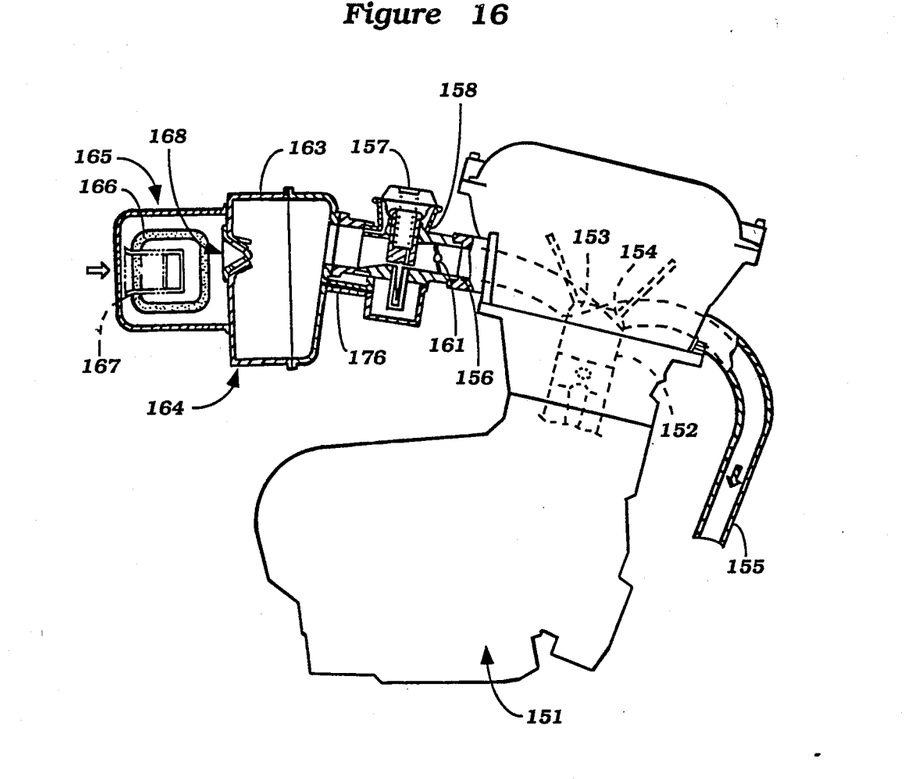
FIG. 16 is a side elevational view, with portions shown in cross-section, similar to FIGS. 1, 11 and 13 showing a still further embodiment of the invention.
Figure 17:
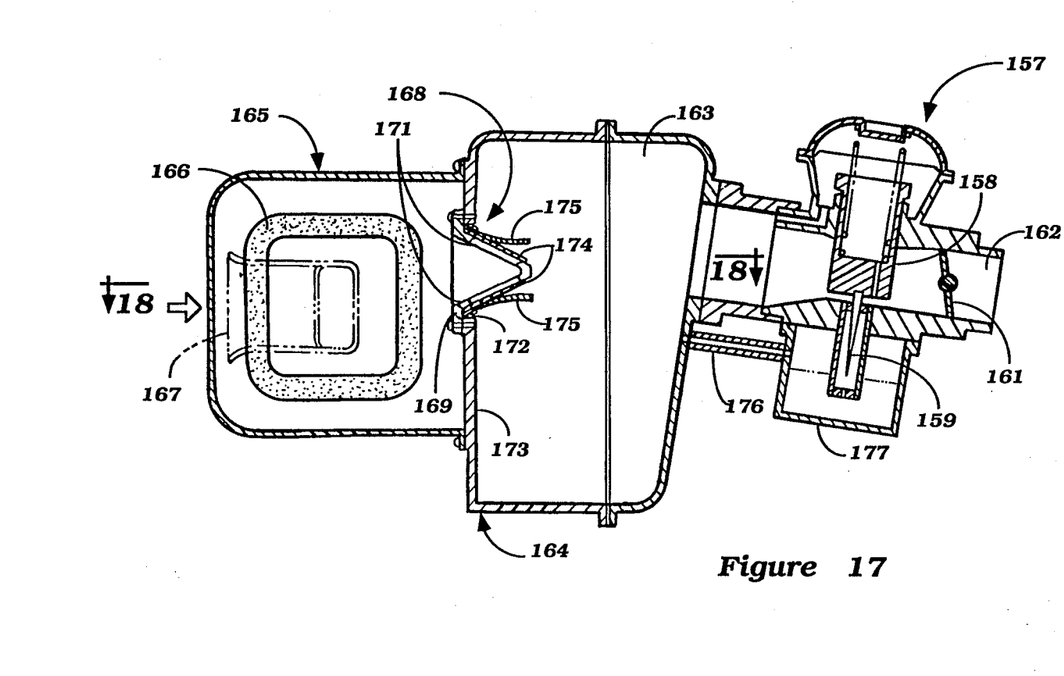
FIG. 17 is an enlarged cross-sectional view showing a portion of the induction system of the embodiment of FIG. 16.
Figure 18:
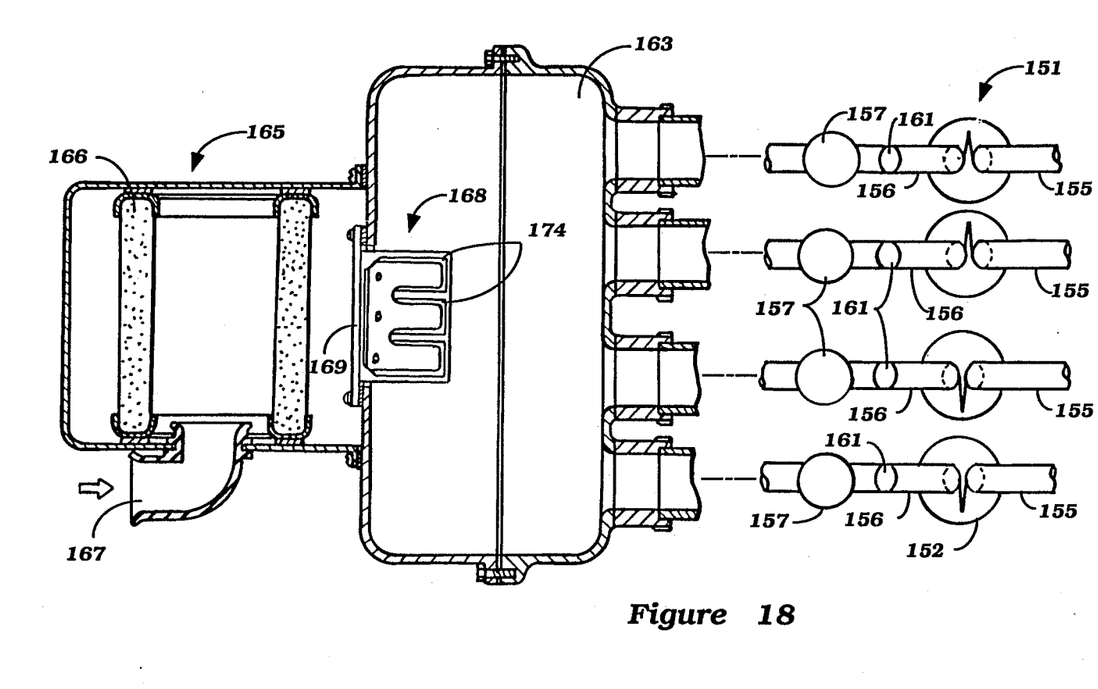
FIG. 18 is a cross-sectional view taken along the line 18—18 of FIG. 17.

Embodiment of FIGS. 16 through 18:

As has been previously discussed, in addition to improving induction efficiency by providing air flow to the induction system other than across the compressor impeller when the compresser is not generating much boost, the use of reed type check valves in the inlet to the plenum chamber improves charging efficiency even when the supercharger is not employed. Such an embodiment is shown in FIGS. 16 through 18 wherein an engine so constructed is identified generally by the reference numeral 151. The engine 151 in the illustrated embodiment is of the 4 cylinder in line, 4-stroke system and employs cylinders 152 in which pistons are supported and which include respective intake and exhaust valves 153 and 154. Exhaust gases flow past the exhaust valves 154 into exhaust pipes 155 for eventual discharge to the atmosphere through a muffler (not shown).

The engine cylinder head has individual intake ports 156 for each cylinder 152 which are served by individual carburetors 157 of any known type. In the illustrated embodiment, the carburetors 157 are of the SU type having a sliding piston 158 that is movable to maintain a constant pressure drop and which is connected to a metering rod 159 in a known manner. Individual throttle valves 161 are positioned in the outlet conduits 162 of the carburetors 157 and are operated simultaneously in any suitable manner.

The carburetors 157 all have their inlets supplied with the inlet charge from a plenum chamber, indicated generally by the reference numeral 163. As with the embodiment of FIGS. 1 through 6, the plenum chamber includes an outer housing assembly 164 to which is integrally connected an air cleaner section 165. Thus, the air cleaner 165 and plenum chamber 163 form a compact assembly that lends itself to installation in vehicles where size is of a premium, such as motorcycles.

The air cleaner section 165 supports a filter element 166 in a suitable manner. The filter element 166 is annular in shape and an air inlet opening 167 delivers the intake air to the interior of the filter element 166.

Air flows from the air cleaner section 165 into the plenum chamber 163 through a single, compound, reed type check valve 168. The check valve 168 consists of a valve plate 169 having a generally triangular cross section, as shown in FIG. 17, formed by a pair of converging legs in which a plurality of openings 171 are formed. The plate 169 is affixed in registry with an opening 172 formed in a wall 173 which separates the plenum chamber 163 from the air cleaner section 165. of leaf springs 174 are affixed to the plenum chamber side of the valve plate 173 and have fingers which cooperate to control flow through the openings 171. Backup plates 175 are provided so as to limit the maximum degree of opening of the reed valve fingers 174 and minimize stresses upon them.

The operation of this embodiment is substantially the same as the preceding described embodiments, however, the supercharger is omitted as has been noted. When the engine is running and one of the cylinders 152 is on its intake stroke, a flow will be induced from the plenum chamber 163 through the carburetor 157 into the intake port 156. When the intake valve closes, the flow will tend to continue and check valve 168 which has been opened by the decreased pressure caused as a result of the section stroke will continue to be opened so as to permit air to enter the plenum chamber 163. Thus, a flow inertia will be maintained to build up pressure across the closed intake valve 153 so as to improve induction when the valve 153 next opens. Also, if the throttle valves 161 are suddenly opened, the increased pressure in the plenum chamber 163 will insure good response to acceleration conditions. Because of the increased pressure in the plenum chamber, fuel discharge is most accurately controlled by providing a balance conduit 176 that extends from the plenum changer 163 to an area above the level of fuel in a fuel bowl 177 of each of the carburetors 157.

Figure 19:
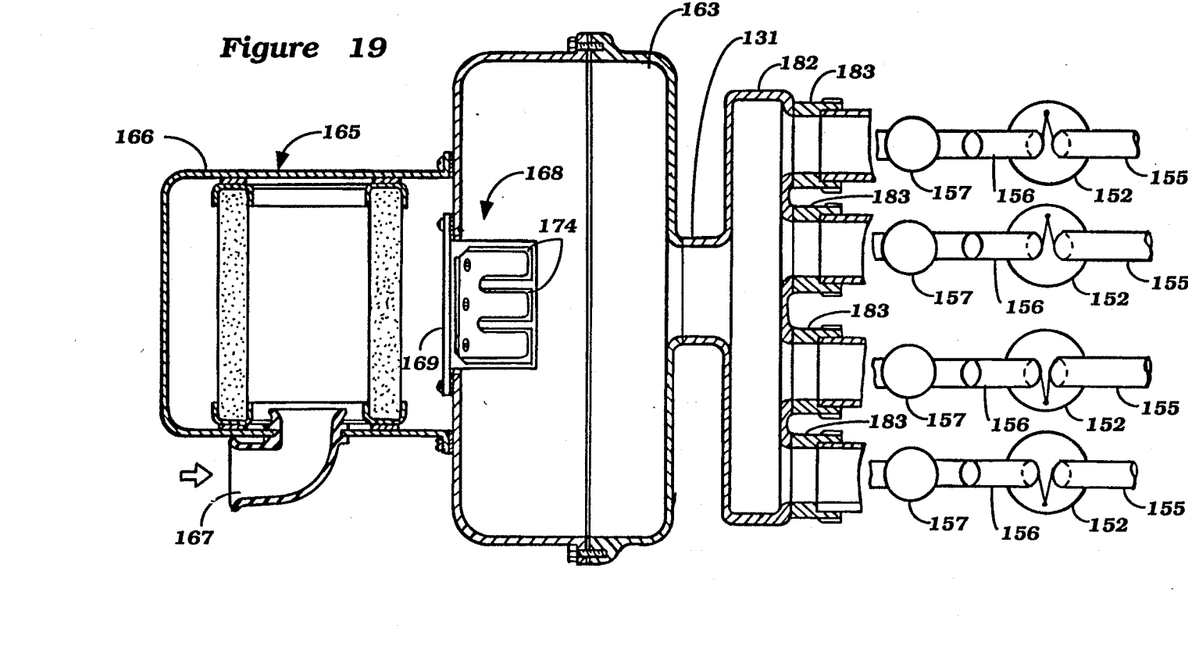
FIG. 19 is a cross-sectional view, in part similar to FIG. 18, showing a still further embodiment of the invention.

Embodiment of FIG. 19:

FIG. 19 illustrates another embodiment of the invention which is similar to FIGS. 16 through 18. The components of this embodiment which are the same as the embodiments of FIGS. 16 through 18 have been identified by the same reference numerals and the description of their construction and operation will not be repeated. In this embodiment, the plenum chamber 163 has a single outlet 181 which serves a manifold 182 which, in turn, has individual outlets 183. Each outlet 183 serves a respective inlet of a carburetor 157. The provision of the additional manifold 182 has the effect of increasing the effective volume of the plenum chamber as well as improve distribution to the respective carburetor 157 under certain conditions.

Recap:

It should be readily apparent that a number of embodiments have been disclosed which permit improved charging efficiency, particularly at low speeds, for either supercharged or normally aspirated engines. Although the supercharged embodiments have all been described in conjunction with turbocharged engines, it is to be understood that certain facets of the invention are equally adaptable to use in engines having crankshaft driven superchargers or other type of superchargers. The term "supercharger" is used here generically to encompass turbochargers and such other positively driven compressors.

The invention has also been described in conjunction with 4 cylinder, 4 cycle reciprocating type engines. Again many facets of the invention may be employed with engines having other numbers of cylinders, including single cylinder engines or engines having other than reciprocating pistons, such as any of the known rotary type engines. Furthermore, the invention is equally adaptable to 2 cycle, crankcase compression type engines. The use of the large capacity plenum chamber and its relationship to the check valve as disclosed improves charging efficiency both with and without a supercharger. With a supercharged engine, the plenum chamber had the additional advantage of protecting the reed type valves from fatigue due to unnecessary opening and closing, as well as minimizing the effects of pulsations in the outlet pressure of the supercharger on the induction system. Preferably the plenum chamber should have a volume that is larger than that of the volume of the individual induction passages which it serves. When the supercharger is employed, the passage that extends from the compressor stage to the plenum chamber has the effect of increasing the effective volume of the plenum chamber during those times when the supercharger is not generating any significant boost.

A number of modifications and embodiments of the invention have been disclosed and still others have been described. It should be readily apparent to those skilled in the art that even further modifications and embodiments are possible within the scope of the invention, as defined by the appended claims.

We claim:

1. An air inlet device for an internal combustion engine comprising housing means defining an internal cavity, wall means as part of said housing means for dividing said cavity into a plenum chamber and an air cleaner chamber, an inlet to said air cleaner chamber, an outlet from said air cleaner chamber, means for supporting an air cleaner element in said air cleaner chamber between said inlet and said outlet, means defining an intake to said plenum chamber, means communicating said air cleaner chamber outlet with said plenum chamber intake, means defining a discharge from said plenum chamber adapted to communicate with an inlet passage of the internal combustion engine and check valve means in said wall means for providing a direct flow path from said air cleaner chamber downstream of said air cleaner element with said plenum chamber.

2. An air inlet device as set forth in claim 1 wherein the means communicating the air cleaner chamber outlet with the plenum chamber inlet comprises a conduit external to said housing means.

3. An air inlet device as set forth in claim 1 wherein the check valve means comprise reed valve means.

4. An air inlet device as set forth in claim 3 wherein the reed valve means comprises a reed valve element pivotally supported at one of its ends and means for biasing said element toward a closed position.

5. An air inlet device as set forth in claim 1 wherein there are a plurality of discharges in the plenum chamber each adapted to cooperate with a respective intake passage of the associated engine.

6. An air inlet device for an internal combustion engine comprising housing means defining an internal cavity, wall means as part of said housing means for dividing said cavity into a plenum chamber and an air cleaner chamber, an inlet to said air cleaner chamber, an outlet from said air cleaner chamber, means for supporting an air cleaner element in said air cleaner chamber between said inlet and said outlet, means defining an intake to said plenum chamber, means communicating said air cleaner chamber outlet with said plenum chamber intake, means defining a plurality of discharges from said plenum chamber each adapted to communicate with a respective inlet passage of the internal combustion engine, and a plurality of openings in said wall means affording a direct path from said air cleaner chamber downstream of said air filter element with said plenum chamber, each of said openings being aligned with a respective of said discharges from said plenum chamber and valve means for controlling the flow through said openings.

7. An air inlet device as set forth in claim 6 wherein the valve means comprises reed valve means.

8. An air inlet device as set forth in claim 7 wherein each of the reed valve means comprises a valve element pivotally supported at one of its ends and biasing means for urging said valve elements to their closed positions.

* * * * *